United States Patent Office 3,102,000
Patented Aug. 27, 1963

3,102,000
PRODUCTION OF ANIMAL FEED SUPPLEMENT OF LOW FLUORINE CONTENT
Thomas J. Malley, Stamford, Darwin F. De Lapp, New Canaan, Sydney A. Giddings, Darien, and Harry F. Cosway, Stamford, Conn., assignors to American Cyanamid Company, New York, N.Y., a corporation of Maine
No Drawing. Filed Jan. 13, 1961, Ser. No. 82,384
6 Claims. (Cl. 23—108)

This invention relates to the preparation of solid phosphates useful as animal feed supplements. More particularly, it relates to the defluorination of triple superphosphate by "low temperature" controlled calcination. Still more specifically, this invention is concerned with the defluorination of triple superphosphate by controlled "low temperature" calcination and followed by the hydrolysis of the so-calcined products to obtain phosphates nutritionally valuable as animal feed supplements.

As is well known, attempts have heretofore been made to produce nutritionally valuable animal feed supplements from superphosphates or triple superphosphates by various techniques. Unfortunately, none is entirely commercially satisfactory. For instance, a superphosphate has been subjected to heat treatment to remove its fluorine content. Calcining temperatures in excess of 1700° F., usually in the range of 2000° F. to 3000° F., are employed to reduce the aforementioned fluorine content to approximately one-half percent or below. Unfortunately, the use of elevated temperatures, i.e., temperatures above 1700° F., has the major drawbacks that it requires large fuel consumption and results in the evolution of copious quantities of noxious sulfur dioxide gas. Such gas is usually discharged directly into the atmosphere. This practice is undesirable since the atmosphere is contaminated or polluted. To chemically or otherwise absorb sulfur dioxide gas is an expensive and troublesome operation. Attempts to obviate these drawbacks have been made involving, for example, the sulfuric acid leaching of a superphosphate as an initial step, then removing the solids so formed and thereafter heat treating the residual solution. The leaching step appears to remove undesirable impurities which interfere with the subsequent heat treating operation; however, this leach step entails an additional operation which renders the over-all process economically unfeasible. The desirability for obtaining an economical process for the manufacture of nutritionally valuable phosphates is well established.

It is, therefore, a principal object of the present invention to provide defluorinated phosphates capable of ready conversion to satisfactory sources of phosphorus for animal nutrition. It is a further object to provide defluorinated, mixed, dehydrated phosphates prepared by calcination at temperatures substantially below 1700° F. It is a further object to economically prepare solid phosphates in nutritionally available form. Other objects and advantages will become apparent from a consideration of the following detailed description.

To this end, triple superphosphate ordinarily containing from about 1 to 3% fluorine, is subjected to a heat treatment at temperatures within the range of from about 1050° F. to about 1300° F. Unexpectedly, the fluorine content is reduced substantially utilizing the aforementioned controlled temperature range. The so-calcined, defluorinated phosphate mixture can next be subjected to hydrolysis, preferably in an acidic medium, to obtain soluble orthophosphates, useful as nutritionally valuable animal feed supplements.

According to the process of the present invention, triple superphosphate, as prepared for instance by intimately contacting phosphate rock and wet process phosphoric acid and curing the mixture for approximately forty days, is calcined at temperatures between about 1050° F. to about 1300° F. Usually ten minutes and not more than one hour are sufficient to cause defluorination to occur. The fluorine content is almost quantitatively reduced.

In general, calcination is carried out in a rotary kiln calciner, whereby the surface of the triple superphosphate is exposed for the ready removal of fluorine and occluded water. Resultant products, obtained from calcining, are believed to be mixed, water-insoluble, dehydrated phosphates. The latter can then be hydrolyzed by the utilization of either superheated steam or hot water to obtain products consisting essentially of desirable phosphates. So-recovered phosphates are then dried by exposure to warm air, heated to between about 100° C. and 160° C. Such dried phosphates are then incorporated in animal feeds as valuable additives.

It is advantageous that the defluorination operation of the present invention can be carried out at relatively "low temperatures," usually between 1050° F. and 1300° F. A prefererd operating temperature range for effecting calcination is one between about 1100° F. and 1200° F. It is a further advantage of the process that the calcination of the triple superphosphate can be carried out in the presence of 1% to 5% added clay, talc or diatomaceous earth to prevent agglomeration and sticking. The defluorination operation is thereby facilitated. Further modifications of the calcination conditions are also contemplated. For instance, additional water vapor can be added, if desired, to the calcining atmosphere in order to increase the rate of fluorine evolution. Mixed, water-insoluble, dehydrated phosphates containing a mol ratio of phosphorus to fluorine of 100 to 1 or better are thus obtained.

Resultant mixed, dehydrated, water-insoluble phosphates so-obtained contain a mixture of dicalcium pyrophosphate, calcium acid pyrophosphate, calcium metaphosphate and polymeric calcium phosphates in a variety of crystalline forms. Further, the fluorine content therein is reduced from appropriately 2.5 percent to 0.26 percent or lower and the phosphorous content expressed as $P_2O_5$ is increased from 47% $P_2O_5$ of the original charge to 60% $P_2O_5$ in the final calcined product. However, the defluorinated, mixed, dehydrated phosphates cannot immediately be employed as an animal feed supplement, for the reason that they are not nutritionally available to the animal. Accordingly, the calcined products must be further processed to convert them to a more useful and desirable form.

Advantageously, the calcined phosphatic mixture can be further processed by subjecting it to either of two general procedures. These are:

(1) Hydrolysis at temperatures between about 60° C. and about 95° C., preferably in the presence of an acid, such as sulfuric or hydrochloric acid, or
(2) Hydrolysis with steam in the presence or absence of an acid, such as sulfuric acid.

In either of the two procedures, the calcined product is initially slurried to the extent of from about 40% to 60% by weight of solids and, preferably, between 50 and 55%. Sufficient acid, usually in amounts equal to 1% to 20% based on the weight of the phosphate expressed as $P_2O_5$ in the calcined material, is added to swiftly effect conversion of insoluble phosphatic compounds to desired soluble form. Further, it has been found advantageous to add one part of slurry to about two to four parts by weight of desired soluble, dried phosphates to facilitate drying of the hydrolyzed slurry. Hence, either procedure contemplates the recycling of a portion of the dried phosphate to the slurried mixture.

The invention will be further illustrated in conjunction with the following examples which are to be taken as illustrative only and not by way of limitation. All parts are by weight, unless otherwise noted.

EXAMPLE 1

Triple superphosphate [previously prepared by admixing 1.6 parts of 54% $P_2O_5$ wet phosphoric acid with one part of finely ground phosphate rock (80% of which passes through a 200 mesh Tyler screen and containing about 34% $P_2O_5$) and allowed to cure for forty days] is the friable product which on analysis contains approximately 47% $P_2O_5$ and a high fluorine content, namely, about 2.2% in the form of metal fluorides, silicon fluorides and hydrogen fluoride. The latter triple superphosphate is pre-mixed with 0.25 part of diatomaceous earth and then fed to a rotary kiln and heated to a temperature between about 1050° F. and 1100° F. for about sixty minutes. The so-calcined product is then removed from the rotary kiln. On analysis, it is found to contain 59% $P_2O_5$ and 0.25% fluorine.

To 300 parts of the calcined product in a suitable reaction vessel equipped with stirrer and thermometer are added 300 parts of water and 10 parts of sulfuric acid. The contents are stirred vigorously, while heating to a temperature of about 90° C. This temperature is maintained for about four hours. The mixture is then removed from the reaction vessel, transferred to a stainless steel tray and placed in an oven maintained at a temperature of about 100° C. to effect the drying of the product. On analysis, the product is found to consist essentially of calcium orthophosphates, which are a completely satisfactory source for phosphorous in an animal nutrition.

EXAMPLE 2

The procedure of Example 1 above is followed in every respect, except that the initial calcination step is carried out at elevated temperatures between 1400° F. and 1450° F. It is found that the resultant "orthophosphates" so produced do not provide satisfactory nutritionally available phosphorous to an animal feed.

EXAMPLE 3

Repeating in every material detail the process of Example 1 above, except that in the calcination step water vapor is added to the kiln. Removal of fluorine is thus facilitated and a good yield of soluble calcium orthophosphates is obtained.

EXAMPLE 4

5 parts of triple superphosphate, as defined in Example 1 above, are admixed with 0.25 part of powdered talc and the mixture is added to a rotary kiln. Water vapor is added to the air stream of the kiln. The contents therein are heated to a temperature of about 1250° F. and maintained at that temperature for one-half hour. On analysis, the fluorine content of the calcined triple superphosphate is reduced from 2.26% to 0.15%, while simultaneously increasing the $P_2O_5$ content from 47% to 59%.

To 300 parts of the latter calcined product in a suitable reaction vessel equipped with stirrer and thermometer are added 300 parts of water and 36 parts of sulfuric acid to form a slurry. The contents are stirred vigorously, while heating to a temperature of about 95° C. This temperature is maintained for about two hours. The slurried mixture is then removed from the reaction vessel and transferred to a stainless steel tray which is placed in an oven maintained at a temperature of about 100° C. to effect the drying of the product.

Three parts of the so-dried product are mixed with one part of the slurried mixture. The wet mixture is then fed to a rotary drier and there dried at a terminal temperature of 160° C. This dried product is next ground to a minus 20 mesh. A minor portion, approximating about one-seventh of the total material is separated as the desired product and the major portion approximating the remaining six-sevenths is used as a recycle to the drying operation.

EXAMPLE 5

Repeating the procedure of Example 4 in every detail except that the hydrolysis of the calcined material is carried out by steam hydrolysis at a pressure of twenty-five pounds per square inch for one hour in a suitable autoclave. The hydrolyzed product is then removed and dried in a rotary drier operating at a discharge temperature of 110° C. The dry product is found to be 95% soluble in 0.4% hydrochloric acid solution and is useful as an animal feed supplement.

To demonstrate the efficiency of the process of the invention, the following example is presented.

EXAMPLE 6

A chicken feed composed of 25% soya bean meal, 25% corn meal and 50% blood fibrin which on analysis contains a total of 0.2% phosphorus is employed as the base diet and fed to groups of 24 test chickens each approximately weighing the same and each being approximately of the same age.

A series of feeds are employed in several tests. Each test involves the base diet used either alone or in combination with the products produced in Examples 1 to 5 above to increase the phosphorus content from 0.2% to 0.6%. The group of 24 chickens employed in each test is fed one of the several diets. Each chicken commences feeding within two days after hatching and terminates after the twenty-third day. The results are tabulated below:

*Table 1*

| Runs | Base Diet (B. D.) plus Phosphatic Compounds (P. C.) Prepared in above Examples | Average Weight in grams after 21 days of feeding | No. of deaths |
|---|---|---|---|
| 6 | B. D. +0% P. C. | | 24 |
| 7 | B. D. +0.4% P. from P. C. of Example 1. | 247 | 0 |
| 8 | B. D. +0.4% P. from P. C. of Example 2. | | 24 |
| 9 | B. D. +0.4% P. from P. C. of Example 3. | 259 | 0 |
| 10 | B. D. +0.4% P. from P. C. of Example 4. | 251 | 0 |
| 11 | B. D. +0.4% P. from P. C. of Example 5. | 263 | 1 |

It will be readily seen that the phosphatic compounds, as prepared in accordance with the present invention, enhance a feed composition which supplies the necessary phosphorus nutrition to test animals. Thus, compounds of Example 2 above cannot be employed as animal feed supplements, whereas the compounds of the remaining examples are more than satisfactory.

We claim:

1. In an improved process for preparing phosphatic animal feed supplement of low fluorine content and of high nutritional availability the improvement which consists essentially in: heat treating triple superphosphate containing more than one percent fluorine at a temperature between 1050° F. and 1350° F. for a time sufficient to effect the reduction of the fluorine content of said triple superphosphate to less than about 0.26 percent; hydrolyzing the so-calcined mixture in the presence of a hydrolyzing agent selected from the group consisting of steam under superatmospheric pressure and hot water at a temperature between about 60° C. and 95° C.; and recovering a phosphatic animal feed consisting essentially of mixed soluble calcium orthophosphates of low fluorine content and of high nutritional availability.

2. The process according to claim 1, in which the hydrolysis step is carried out in the presence of steam under superatmospheric pressure.

3. The process according to claim 1, in which the hydrolysis step is carried out in the presence of hot water at a temperature between about 60° C. and 95° C.

4. The process according to claim 1, in which an aqueous slurry consisting of from 40% to 60% calcined solids is prepared prior to hydrolysis.

5. The process according to claim 1, in which the hydrolysis in hot water is carried out in the presence of about 1% to about 20% sulfuric acid based on the weight of the solids in the slurry.

6. The process according to claim 1, in which the drying of the hydrolyzed slurry is carried out in a rotary drier by admixing said slurry with previously dried product in a weight ratio of 1 part of slurry to 2–4 parts of dried material and drying said mixture at 100° C. to 160° C.

References Cited in the file of this patent

UNITED STATES PATENTS

| | | |
|---|---|---|
| 1,880,491 | Rothe et al. | Oct. 4, 1932 |
| 2,234,511 | Wight et al. | Mar. 11, 1941 |
| 2,565,351 | Butt | Aug. 21, 1951 |